United States Patent [19]

Dall'Occo et al.

[11] Patent Number: 5,532,326
[45] Date of Patent: Jul. 2, 1996

[54] PROCESS FOR PREPARING ELASTOMERIC ETHYLENE COPOLYMERS

[75] Inventors: Tiziano Dall'Occo; Floriano Guglielmi, both of Ferrara; Umberto Zucchini, deceased, late of Ferrara, all of Italy, by Maria Stagni, Silvia Zucchini, Chiara Zucchini, Matteo Zucchini, heirs

[73] Assignee: Montell Technology Company bv, Milan, Italy

[21] Appl. No.: 341,441

[22] Filed: Nov. 14, 1994

Related U.S. Application Data

[63] Continuation of Ser. No. 23,601, Feb. 26, 1993, abandoned.

[30] Foreign Application Priority Data

Feb. 28, 1992 [IT] Italy .................................. MI92A0441

[51] Int. Cl.$^6$ ...................................................... C08F 4/634
[52] U.S. Cl. .................................. 526/125.7; 526/124.2; 526/124.3; 526/124.9; 526/125.2; 526/125.6; 526/901; 502/107; 502/118
[58] Field of Search ................................. 526/125, 124.2, 526/124.3, 124.9, 125.2, 125.6, 125.7, 901

[56] References Cited

U.S. PATENT DOCUMENTS

| | | | |
|---|---|---|---|
| 3,953,414 | 4/1976 | Galli et al. | 526/348 |
| 4,071,672 | 1/1978 | Kashiwa et al. | 526/122 |
| 4,399,054 | 8/1983 | Ferraris et al. | 252/429 B |
| 4,469,648 | 9/1984 | Ferraris et al. | 264/9 |
| 4,579,833 | 4/1986 | Collomb et al. | 502/104 |
| 5,070,054 | 12/1991 | Bailly et al. | 502/104 |
| 5,098,875 | 3/1992 | Bailly et al. | 502/10 |

FOREIGN PATENT DOCUMENTS

| | | |
|---|---|---|
| 155770 | 2/1985 | European Pat. Off. . |
| 0262987 | 4/1988 | European Pat. Off. . |
| 412729 | 8/1990 | European Pat. Off. . |
| 0436325 | 7/1991 | European Pat. Off. . |
| 0439838 | 8/1991 | European Pat. Off. . |
| 0449673 | 10/1991 | European Pat. Off. . |
| 2235926 | 3/1991 | United Kingdom . |

OTHER PUBLICATIONS

Derwent Abstract and Family Search of EP 155 770 (Date unknown).
Derwent Abstract and Family Search of EP 412 729 (date unknown).
Grant & Hackh's Chemical Dictionary, Fifth Ed., Grant et al. (editors), McGraw-Hill Book Co., New York, 1987, p. 24.

*Primary Examiner*—Romulo H. Delmendo
*Attorney, Agent, or Firm*—Bryan Cave

[57] ABSTRACT

Process for preparing elastomeric copolymers of ethylene with α-olefins $CH_2=CHR$, optionally containing minor proportions of a diene, characterized by the use during the polymerization of a catalyst comprising the reaction product of:

(I) a solid component comprising $VCl_3$ supported on a magnesium dihalide in spherical or spheroidal shape, in active form;

(II) an alkyaluminum compound;

(III) optionally a halohydrocarbon.

$VCl_3$ is precipitated on said magnesium dihalide by heating $VCl_4$ solutions in inert hydrocarbon solvents.

16 Claims, No Drawings

PROCESS FOR PREPARING ELASTOMERIC ETHYLENE COPOLYMERS

This is a continuation of U.S. application Ser. No. 08/023,601, filed Feb. 26, 1993, now abandoned.

The present invention relates to a process for the preparation of elastomeric copolymers of ethylene with α-olefins $CH_2$=CHR, wherein R is an alkyl radical having 1–10 carbon atoms, optionally containing minor proportions of units derived from a diene or a polyene. The polymerization is carried out in the presence of a catalyst comprising a vanadium compound supported on a spheroidal magnesium dihalide in active form.

The copolymerization of ethylene and α-olefins, optionally in the presence of dienes, was carried out up to now with several types of catalysts: one of the most known catalyst types is the homogeneous system formed by the reaction product of a vanadium compound, such as vanadium triacetylacetonate $V(AcAc)_3$, with alkylaluminumhalides, in particular $AlEt_2Cl$.

These catalysts display the advantage that they give rise to amorphous copolymers within a wide range of compositions and therefore are suitable for yielding after vulcanization elastomeric products displaying valuable properties.

Because they are homogeneous systems, these catalysts are not capable of supplying copolymer particles having a controlled morphology.

The activity of the catalysts is moreover relatively low and this results in a high content of catalytic residues derived from vanadium being present in the end polymer; better yields are obtained only when halohydrocarbon are used as activators. However, as a consequence of the presence of the halohydrocarbon, a large amount of halogen containing residues is present in polymer and this has a negative influence on the quality of the product, besides causing phenomena of corrosion of production and processing equipment, so that the obtained material has to be submitted to lengthy and expensive purification processes.

The catalysts are used in polymerization processes carried out in the presence of an inert hydrocarbon in which the copolymer formed is dissolved, or in liquid propylene, in which the copolymer forms a suspension. Owing to the rubber-like character of the copolymer obtained, phenomena of adhesion to reactor walls may occur and agglomerates may be formed, which prevent a smooth progressing of the process, and lead to the presence of unmelted products and/or inhomogeneity in the end product. Particular problems are moreover found when the polymerization is carried out in liquid monomer: at the end of the process, the monomer in which the polymer is suspended is removed by venting and/or flashing, causing a compact polymeric mass to be formed which is difficultly processed and discharged from the reactor.

These problems can be partially solved by using catalysts of the heterogeneous type, obtained by supporting vanadium compounds on organic or inorganic carriers having a defined morphology. The carrier typically consists of silica; however in this case the supporting technique suffers from the drawback that it generally leads to catalysts with low activity.

Vanadium based catalysts having precise morphological characteristics which render them suitable for preparing polyethylene in the gas phase are described in European Patent EP-A-155770. Such catalysts are obtained by precipitating $VCl_4$ or $VOCl_3$ on a carrier which substantially consists of $MgCl_2$ containing some Mg—C bonds. The precipitation of vanadium compounds, for instance $VCl_4$, takes place at temperatures comprised between 20° and 50° C.; under these conditions, only a fraction of used $VCl_4$ remains fixed on $MgCl_2$.

European Patent EP-A-412729 discloses components of vanadium-based catalysts having a spherical morphology which can be used in the processes of olefin polymerization in the gas-phase. These components are obtained by a process which comprises several steps, by means of which mixtures of vanadium compounds, such as $VCl_4/VO(OR)_3$ or $VOCl_3/VO(OR)_3$, are precipitated on $MgCl_2$ by treatment with alkylaluminum dihalides (generally $AlEt_2Cl$).

It has now been unexpectedly found that elastomeric copolymers of ethylene having controlled morphology can be produced with good yields, both by gas-phase process and liquid monomer process, by using a vanadium-based catalyst obtained by precipitating under suitable conditions $VCl_3$, from $VCl_4$, on a spheroidal magnesium dihalide in active form.

The process according to the present invention is characterized by the use of a catalyst comprising the product of reaction of:

(I) a solid component containing a vanadium trichloride supported on a magnesium dihalide in spherical or spheroidal shape in active form, in which said vanadium trichloride, present in Mg/V ratios lower than 6, is precipitated on magnesium dihalide by heating solutions of $VCl_4$ in inert hydrocarbon solvents;

(II) an alkylaluminum compound;

(III) optionally a halohydrocarbon.

The polymerization yields of the processes according to the present invention are at least of the same level as of yields obtained when homogeneous vanadium catalysts, such as $V(AcAc)_3$, are used. In particular, when trialkylaluminum compounds are used together with the vanadium compound, polymers can be obtained with much higher yields than obtained with the traditional homogeneous catalysts without resorting to the use of halogenated promoters; by suitably varying the co-catalyst and using a promoter, it is possible to obtain copolymers which are further characterized by a high randomization of the comonomers and absence of a block copolymer structure, as shown by $^{13}$C-NMR analysis.

At the end of the process, the polymer is obtained in the form of spheroidal particles having size between 0.3 and 3 mm, which do not adhere to each other, independently of whether the process is carried out in gas phase or in liquid monomer. In the latter case, differently from the processes known from the prior art, the polymer can be easily and rapidly discharged from the polymerization reactor. Furthermore, no problem of adhesion to reactor walls or agglomeration exist during polymerization.

The component (I) of the catalyst useable in the process according to the present invention comprises the reaction product of:

(a) a magnesium halide in active form obtained by decomposing spherical or spheroidal adducts of a magnesium halide with an electron donor compound;

(b) an electron donor compound;

(c) $VCl_4$.

The reaction is carried out at temperature higher than 60° C., and preferably between 95° and 105° C. $VCl_4$ is preferably used in solution in an inert hydrocarbon.

Under these conditions $VCl_4$ is reduced to $VCl_3$ and the product formed precipitates onto magnesium halide.

The magnesium dihalides in active form are characterized by X ray spectra in which the most intense diffraction line present in the spectrum of non-active halide is decreased in intensity, and in said spectra a halo appears, the maximum intensity of which is shifted towards lower angles compared with that of the most intense line.

The particles have a spherical or spheroidal morphology with an average diameter comprised between 20 and 130 μm. By "particles with spherical or spheroidal morphology" those particles are intended in which the ratio of the major axis to the minor axis is equal to, or less than 1.5, and preferably lower the 1.3.

The magnesium dihalide in active form, preferably magnesium dichloride, is obtained for example by starting from adducts of formula $MgCl_2 \cdot nROH$, in which R is an alkyl, cycloalkyl or aryl radical having 1–12 carbon atoms and n is generally greater than 2 and in particular is between 2.5 and 3.5. These adducts are prepared in spherical form from molten adduct by emulsifying them in a hydrocarbon solvent and then causing them to solidify by rapid cooling. A representative method for preparing these spherical form adducts is reported in U.S. Pat. No. 4,469,648, the disclosure of which is incorporated herein by reference. The resulting spherical form adducts are subjected to thermal dealcoholation, optionally followed by a treatment with chemical agents capable of reacting with hydroxy groups of the alcohol, with further dealcoholation of the adduct, until the alcohol content is decreased to values generally lower than 15% by weight, preferably lower than 10%.

According to another method the carrier can be prepared by hydrated magnesium dihalide, preferably from hydrated magnesium dichloride, in particular from $MgCl_2 \cdot 6H_2O$ obtained with spherical shape according to the method described in U.S. Pat. No. 3,953,414.

Preferably the magnesium dihalide is reacted with the electron donor compound before being reacted with $VCl_4$.

The electron donor compounds comprise the organic Lewis bases, such as ethers, esters, ketones, amines. Particularly suitable for use in the process of the present invention are the esters of aliphatic and aromatic monocarboxylic acids and the esters of aromatic polycarboxylic acids. Preferred electron donor compounds are the esters of aromatic monocarboxylic acids, in particular ethylbenzoate (EB) and methyl paratoluate (MPT).

The solid catalyst component used in the process according to the present invention is characterized by a ratio of Mg/V lower than 6 and preferably lower than 3. The catalyst component is prepared by operating at temperatures between 60° and 110° C., preferably between 95° and 105° C., for a time period of from 2 to 5 hours, in inert hydrocarbon solvents. Under these conditions more than 40% of the vanadium compound is fixed on magnesium halide and is not extracted by n-hexane.

The reaction product obtained in spherical shape shows an X-ray spectrum in which the broadened peaks of the activated form of $MgCl_2$ and $VCl_3$ are present.

The size of the particle of the spherical component depends on the size of the used carrier and generally is between 20 and 150 μm.

The components obtained in that way form catalyst, by reacting with alkylaluminum compounds, in particular Al-trialkyl and Al-dialkyl monohalides, which can be used in the polymerization process according to the present invention.

The Al-alkyl compound is used in amounts corresponding to molar ratios of Al/V between 5 and 500, in particular between 5 and 200, preferably between 15 and 100.

Together with Al-alkyl compound, a polymerization promoter can be used in order to further increase the productivity and improve randomization. The promoters generally are halohydrocarbons of the $R'X$ type, in which $R'$ is an aliphatic or cycloaliphatic or aromatic alkyl group and X is either Cl or F.

Usual examples are: $CHCl_3$, $CFCl_3$, $CH_2Cl_2$, benzoylchloride, benzylchloride, ethyltrichloroacetate, n-butylperchlorocrotonate (nBPCC), hexachlorocyclopentadiene, hexachloropropylene, 1,2-difluorotetrachloroethylene. Preferably, with compounds of the $AlR_3$ type, $CHCL_3$ is used, and with compounds of the $AlR_2X$ type, nBPCC (n-butyl-perchlorocrotonate) is used.

The promoter is used in the process according to the present invention in order to produce elastomeric ethylene copolymers that are either saturated or unsaturated.

The saturated elastomeric copolymers contain from 15 to 85% by mole of ethylene units, the balance to 100% being constituted by units derived from one or more α-olefins $CH_2=CHR$; besides the units deriving from the polymerization of ethylene and one or more α-olefins, the unsaturated elastomeric copolymers additionally contain minor proportions of units derived from the copolymerization of one or more polyenes, which may be either conjugated or not. The content of unsaturated units may be as high as 5 mol % and preferably is between 0.5 and 2%.

The α-olefins which may be used preferably comprise propylene, 1-butene, 4-methyl-1-pentene. As polyene units capable of supplying unsaturated units, conjugated dienes may be used, such as 1,3-butadiene and isoprene; straight chain, non-conjugated dienes, such as 1,4-(cis or trans)-hexadiene, 6-methyl-1,5-heptadiene, 3,7-dimethyl-1,6-octadiene; alkenyl or alkylidene-norbornenes, such as 5-ethylidene-2-norbornene, 5-isopropylidene-2-norbornene; and monocyclic diolefins, such as cis,cis-1,5-cyclooctadiene, and 5-methyl-1,5-cyclooctadiene, 4,5,8,9-tetrahydroindene.

The process according to the present invention can be carried out either in gas phase or in liquid monomer. The gas-phase process is carried out by using, e.g., the well known technique of fluidized bed or under conditions in which the polymer is mechanically stirred, and operating in one or more reactors. The polymerization temperature is generally between 10° and 60° C., preferably between 20° and 50° C. The pressure is generally between 0.5 and 3 MPa and preferably between 1 and 2 MPa. In liquid monomer the process is carried out under pressures between 1 and 5 MPa, preferably between 1.5 and 3 MPa.

The molecular weight of the resulting polymers can be regulated by using molecular weight regulator agents, such as, e.g., hydrogen.

The following examples are given in order to better illustrate the invention without limiting it. The "B" value obtained by $^{13}C$-NMR analysis is a measure of the block content of copolymers and is given by the ratio of $(P_{2-3})/(2 \cdot P_2 \cdot P_3)$, wherein: $P_{2-3}$ is the ratio of $C_2$–$C_3$ bonds to total bonds; $P_2$ and $P_3$ are the molar fractions of $C_2$ and $C_3$ respectively. When B=1, random copolymers are obtained; when B=2 the polymers are of alternating type; when B=0, either block copolymers and/or copolymer blends are obtained. B value higher than 1 indicate good copolymer randomization.

EXAMPLE

Preparation of the Spherical Carrier

An adduct of magnesium chloride/ethyl alcohol, prepared by following the same methodologies as disclosed in U.S. Pat. No. 4,399,054, and containing about 3 mols of alcohol per mol of $MgCl_2$, was submitted to thermal treatment until an ethanol content of 5% by weight was obtained. This adduct was used as the spherical carrier for the preparation of catalyst components as described in the following examples.

EXAMPLE 1

A 250 cm$^3$ flask equipped with mechanical stirrer, reflux condenser, thermometer and dripping funnel was purged with anhydrous nitrogen. 100 cm of anhydrous hexane and 10 g of MgCl$_2$ prepared as described hereinabove were introduced. While keeping the suspension continuously stirred, a solution of 3.17 cm$^3$ of ethylbenzoate (EB) in 50 cm$^3$ of anhydrous hexane was added over 30 minutes at room temperature. The resulting suspension was stirred for 30 minutes at 25° C.; whilst keeping the suspension thermostatted at 30° C., the solvent was then removed by means of a low stream of anhydrous nitrogen, until a free-flowing powder was obtained.

The solid product was dispersed in 50 cm$^3$ of anhydrous heptane; then a solution of 11.8 cm$^3$ of VCl$_4$ in 50 cm$^3$ of anhydrous heptane was added over 10 minutes and at room temperature. The suspension was heated up to solvent refluxing temperature over 60 minutes and was kept stirred at that temperature for 3 hours. The dark-coloured suspension obtained was filtered at 50° C. and the solid residue was repeatedly washed with anhydrous hexane until a liquid phase free of Cl ions was obtained. After drying at 40° C. under vacuum 22.1 g of a violet powder was obtained. The characteristics of the catalyst component are reported in Table 1.

EXAMPLE 2

The process was carried out in the same way as in Example 1, but using 7.35 cm$^3$ of VCl$_4$. The characteristics of the catalyst component are reported in Table 1.

EXAMPLE 3

The process was carried out in the same way as in Example 1, but using 3.5 g of methyl-paratoluate (MPT) instead of EB and 7.12 cm$^3$ of VCl$_4$. The characteristics of the catalyst component are reported in Table 1.

COMPARATIVE EXAMPLE 1

In this example a catalyst component was prepared without using an electron donor compound. A 250 cm$^3$ flask equipped with mechanical stirrer, reflux condenser, thermometer and dripping funnel was purged with anhydrous nitrogen. Then 50 cm$^3$ of anhydrous heptane and 10 g of MgCl$_2$ were charged according to general methodologies as previously described. Over 10 minutes and room temperature a solution of 11.8 cm$^3$ of VCl$_4$ in 50 cm$^3$ of anhydrous heptane was added. The resulting reaction mixture was heated up to the solvent refluxing temperature over 60 minutes and then kept stirred at this temperature for 3 hours. The dark-coloured suspension was filtered at 50° C. and the solid residue was repeatedly washed with anhydrous heptane until a liquid phase free of Cl ions was obtained. After drying at 40 ° C. under vacuum, 25.8 g of a violet-coloured powder was obtained, having the characteristics as reported in Table 1.

COMPARATIVE EXAMPLE 2

In the present example a catalyst component was prepared in which the molar ratio of Mg/V was higher than 6. The process was carried out as in Example 1, but using 3.24 cm$^3$ of EB and 2.0 cm$^3$ of VCl$_4$. A component having a molar ratio Mg/V equal to 7.1 was obtained, whose characteristics are reported in table 1.

Polymerization in Liquid Monomer

General Procedure

A 1.3 l stainless steel autoclave was used, which was equipped with a magnetic-drive stirrer, pressure gauge, thermometer, catalyst charging system, monomer feed lines and forced circulation temperature control jacket.

The autoclave was purged by washing with propylene gas at approximately 70° C. After cooling to room temperature the various monomer were fed in such amounts as specified in the individual examples. The catalytic complex was separately prepared inside a dripping funnel by previously bringing the solid component, the alkylaluminum and optionally the promoter in contact with each other for 5 minutes in a few cm$^3$ of hexane. The catalytic suspension, comprising from 10 to 30 mg of solid component, was subsequently fed to the autoclave at room temperature. After sealing the autoclave, the reaction temperature was increased over about 5 minutes up to reaction conditions and was kept constant throughout the test. The pressure was kept constant by feeding ethylene. At the end of the test the reaction was quenched by rapidly venting the monomers; the discharged polymer was oven-dried under a nitrogen stream at 60 ° C.

EXAMPLE 4

By using the component prepared in Example 1, a test of polymerization in liquid monomer was carried out according to the general procedure described hereinabove, using as cocatalyst Al(nC$_4$H$_9$)$_x$(iC$_4$H$_9$)$_{3-x}$ in an amount of 3.14 mmol. 489 g of propylene was charged to the autoclave, and the polymerization was carried out with a molar ratio of C3/C2 of 6, at the temperature of 40° C. The pressure was kept constant at 23.7 bars; after 90 minutes the test was discontinued. The yields and the characteristics of the polymer obtained as spheroidal particles are reported in Table 2.

EXAMPLE 5

Example 4 was repeated using the component prepared, according to Example 2. The test was discontinued after 120 minutes. The yields and the characteristics of the polymer obtained as particles of spheroidal shape are reported in Table 2.

EXAMPLE 6

Example 4 was repeated using the components prepared according to Example 3 and operating in a 4 liters autoclave. Initially 1507 g of propylene was introduced; the test was then carried out according to example 4. The test was discontinued after 120 minutes. The yields and the characteristics of the resulting polymer, obtained as particles with spheroidal shape, are reported in Table 2.

COMPARATIVE EXAMPLE 3

Example 4 was repeated using the component prepared according to comparative Example 1. The test was discontinued after 120 minutes. The yields and the characteristics of the polymer obtained as particles of spheroidal shape are reported in Table 2.

COMPARATIVE EXAMPLE 4

Example 4 was repeated using the component prepared according to comparative Example 2. The test was discontinued after 120 minutes. A partial agglomeration of the reaction product occurred. The yields and the characteristics of the polymer obtained as particles of spheroidal shape are reported in Table 2.

COMPARATIVE EXAMPLE 5

Example 4 was repeated using $V(AcAc)_3$ as a homogeneous catalyst component and $AlEt_2Cl$ as the cocatalyst. After 30 minutes the catalyst was inactive. The test was repeated using nBPCC as promoter in an amount of 1.7 mmol (nBPCC/V=20). The test was discontinued after 120 minutes. The yields and the characteristics of the resulting polymer are reported in Table 2.

EXAMPLE 7–10

Polymerization in Gas Phase

The same reaction equipment as described for the polymerization in liquid monomer was used. After purging the autoclave, about 60 g of previously dried NaCl was added at room temperature in order to act as dispersing means. Then the monomers and possibly hydrogen were fed according to the desired composition, in the amounts as reported in Table 3.

EXAMPLE 11 AND COMPARATIVE EXAMPLE 6

A $^{13}$C-NMR analysis was carried out on the polymer produced according to Example 4, but using during the polymerization diethylaluminum chloride and nBPCC, instead of MAB. The data relevant to the length of [CH$_2$] sequences, the "B" value and the product of reactivity ratios $r_1 \cdot r_2$ are reported in table 4. The "B" value obtained evidences a good distribution of the comonomer at the same level as of the values obtained with the traditional homogeneous catalysts. In Table 4 (comparative example 6), also the "B" value is reported for the polymer of comparative example 5, obtained by using homogeneous catalysts.

COMPARATIVE EXAMPLE 7

A polymerization in liquid monomer was carried out using a catalyst prepared according to Example 1, but using as carrier, instead of active MgCl$_2$, silica activated at 600° C. The polymerization was carried out according to Example 4. Yields and characteristics of the obtained polymer are reported in Table 2.

EXAMPLE 12

A terpolymer ethylene/propylene/1,4-hexadiene was prepared by polymerization in liquid monomer using the catalyst described in Example 1. The process was carried out as described in Example 4, but using a 4 l autoclave and introducing 1000 g of propylene; the pressure was kept constant at 26.2 bars by feeding a C3/C2 mixture with a molar ratio of 7. Using Al(nC$_6$H$_{13}$)$_3$ as the cocatalyst, the polymerization was carried out at 40° C. for 4 hours. At the end a terpolymer containing 1.5% of diene by weight was obtained with yields of 1520 g/g catalyst.

TABLE 1

| Example No. | V % by weight | Cl % by weight | Mg % by weight | Donor % by weight | solv. % b.w. |
|---|---|---|---|---|---|
| 1 | 10,4 | 57,2 | 10,4 | 14,6 (EB) | 1,2 |
| 2 | 11,5 | 57,5 | 11,6 | 13,0 (EB) | 1,2 |
| 3 | 12,3 | 55,4 | 10,9 | 15,2 (MPT) | 0,9 |
| 1 comp. | 19,9 | 65,9 | 8,6 | / | 0,1 |
| 2 comp. | 4,3 | 50,2 | 14,5 | 21,3 | 0,9 |

(composition of solid catalyst components)

TABLE 2

(polymerization in liquid monomer)

| Ex. No. | activity g/g cat | activity g/g V.h | % C3 | I.V. (dl/g) | xylene solubles % b.w. | xylene solubles % C3 | xylene solubles I.V. (dl/g) | xylene insolubles % b.w. | xylene insolubles % C3 | xylene insolubles I.V. (dl/g) |
|---|---|---|---|---|---|---|---|---|---|---|
| 4 | 7371 | 47478 | 52,5 | 12,6 | 93,4 | 53,5 | 7,6 | 6,6 | | 13,3 |
| 5 | 11158 | 48513 | 54,5 | 12,0 | 91,0 | 60,2 | 4,3 | 9,0 | | 10,0 |
| 6 | 5513 | 22501 | 51,5 | 12,3 | 81,0 | 55,5 | 5,9 | 19,0 | 55 | |
| 3 comp. | 4898 | 12306 | 44,5 | 12,1 | 84,2 | 51,5 | 6,5 | 15,8 | | |
| 4 comp. | 1523 | 17920 | 44,5 | 12,5 | 75,5 | 56 | 5,1 | 24,5 | 30 | 17,4 |
| 5 comp. | 2783 | 9512 | 46 | 3,8 | 100 | 46,8 | 3,8 | 0 | | |
| 7 comp. | 350 | 2550 | 36 | | 60,0 | 47 | | 40,0 | | |

TABLE 3

(Gas-phase polymerization)

| | Polymerization conditions | | | | | | | Yield | | | |
|---|---|---|---|---|---|---|---|---|---|---|---|
| Ex. No. | initial C3 (g) | C3/C2 (mol) | P tot (bar) | P H$_2$ (bar) | T (°C.) | Polym. (min) | AlR$_3$ (type) | g/g cat | g/g V. h | C3 % b.w. | I.V. (dl/g) |
| 7 | 22 | 2,5 | 10,2 | / | 20 | 120 | MAB | 1812 | 8754 | 52,4 | 10,2 |
| 8 | 21 | 1,7 | 11,24 | 0,04 | 20 | 120 | MAB | 1296 | 6260 | 50,5 | 6,3 |
| 9 | 21 | 1,7 | 11,24 | 0,04 | 20 | 120 | TNHA | 2481 | 11988 | 40,5 | 5,0 |
| 10 | 22 | 2,0 | 11,64 | 0,04 | 40 | 120 | TNHA | 2525 | 12198 | 53,8 | 5,0 |

MAB = Al(nC$_4$H$_9$)$_x$(iC$_4$H$_9$)$_{3-x}$
TNHA = Al(nC$_6$H$_{13}$)$_3$

TABLE 4

| | (composition according to NMR analysis) | | | | | | | |
|---|---|---|---|---|---|---|---|---|
| Ex. No. | C2 % b.w. | Length of [CH$_2$]$_n$ sequences (molar fraction) | | | | | | B value |
| | | X$_1$ | X$_2$ | X$_3$ | X$_4$ | X$_5$ | X$_{6+}$ | (×100) | r$_1$ · r$_2$ |
| 11 | 53,5 | 0,245 | 0,131 | 0,199 | 0,072 | 0,115 | 0,238 | 109,1 | 0,670 |
| 6 comp. | 52,6 | 0,204 | 0,130 | 0,222 | 0,068 | 0,139 | 0,237 | 117,3 | 0,502 | r$_1$ · r$_2$ = product of reactivity ratios

It is claimed:

1. In a process for preparing elastomeric copolymers of ethylene with α-olefins CH$_2$=CHR, wherein R is an alkyl radical having 1–10 carbon atoms, containing from 20 to 80% by mol of ethylene, by polymerization of a mixture of ethylene with one or more of said α-olefins in the presence of a catalyst, in gas phase or in liquid phase, the improvement wherein said catalyst is the product of the reaction of:
(I) a solid component comprising vanadium trichloride supported on a magnesium dihalide having a spherical or spheroidal morphology in active form with a major to minor axis of equal to or less than 1.5 in which said vanadium trichloride, present in Mg/V ratios lower than 6, is precipitated on the magnesium dihalide by heating a solution of VCl$_4$ in an inert hydrocarbon solvent at a temperature of from 60° to 110° C. with; (II) an alkylaluminum compound.

2. The process according to claim 1 wherein said catalyst comprises the product of the reaction of:
(I) said solid component;
(II) said alkylaluminum component; and
(III) a polymerization promoter compound selected from the group consisting of compounds having the formula R$^1$X, wherein R$^1$ is an aliphatic or cycloaliphatic or alkylaryl group and X is Cl or F.

3. Process according to claim 1 characterized in that component (I) comprises the reaction product of:
(a) a magnesium dihalide in active form, obtained by means of the decomposition of spherical adducts of a magnesium halide with an electron donor compound;
(b) an electron donor compound;
(c) VCl$_4$;
said reaction being carried out at a temperature between 60° and 110° C.

4. Process according to claim 3 characterized in that component (I) is prepared at a temperatures between 95° and 105° C.

5. Process according to claim 3 characterized in that said magnesium dihalide is MgCl$_2$.

6. Process according to claim 3 characterized in that the electron donor compound (b) is selected from the group consisting of esters, ethers, ketones, and amines.

7. Process according to claim 6 characterized in that said electron donor compound (b) is the ester of an aromatic monocarboxylic acid.

8. Process according to claim 3 characterized in that at least 40% by mol of the vanadium compound used in the preparation of component (I) remains fixed on the supporting carrier and is not-extracted with n-hexane.

9. Process according to claim 1 characterized in that the molar ratio of Mg/V in the component (I) is lower than 3.

10. The process according to claim 1 wherein component (II) is selected from the group consisting of trialkyl-aluminum compounds and dialkyl aluminum monohalides.

11. The process according to claim 1 wherein the α-olefin is selected from the group consisting of 1-butene, and 4-methyl-1-pentene.

12. Process according to claim 1 characterized in that the copolymer contains minor proportions of units derived from a polyene.

13. Process according to claim 1 characterized in that the process is carried out in the gas phase at a temperature between 10° and 60° C. and a pressure between 0.5 and 3 MPa.

14. Process according to claim 1 characterized in that the process is carried out in suspension in liquid monomer at a temperature between 10° and 60° C. and a pressure between 1 and 5 MPa.

15. The process according to claim 1 wherein said catalyst comprises the product of the reaction of:
(I) said solid component;
(II) said alkylaluminum component; and
(III) a polymerization promoter compound selected from the group consisting of CHCl$_3$, CFCl$_3$, CH$_2$Cl$_2$, benzoyl chloride, benzyl chloride, ethyltrichloroacetate, n-butylperchlorocrotonate, hexachlorocyclopentadiene, and 1,2-difluorotetrachloroethylene.

16. The process according to claim 1, wherein the magnesium dihalide having a spherical or spheroidal morphology in active form has a major to minor axis of equal to or less than 1.3.

* * * * *